United States Patent [19]

Richardt

[11] Patent Number: 5,438,163
[45] Date of Patent: Aug. 1, 1995

[54] BLOCKSTOP FOR LONGITUDINAL SEALING OF A CABLE AND A METHOD OF FORMING THE BLOCKSTOP

[75] Inventor: Uwe Richardt, Herdecke, Germany

[73] Assignee: RXS Schrumpftechnik Garnituren GmbH, Hagen, Germany

[21] Appl. No.: 164,197

[22] Filed: Dec. 9, 1993

[30] Foreign Application Priority Data

Dec. 9, 1992 [DE] Germany .................. 42 41 483.0

[51] Int. Cl.⁶ .......................................... H02G 15/04
[52] U.S. Cl. ........................................ 174/76; 156/49; 174/20; 174/22 R; 174/74 R
[58] Field of Search ............... 174/19, 20, 22 R, 23 R, 174/74 R, 76, 84 R; 156/49

[56] References Cited

U.S. PATENT DOCUMENTS

| | | | |
|---|---|---|---|
| 4,428,790 | 1/1984 | Diaz | 156/86 |
| 4,545,830 | 10/1985 | Dienes et al. | 156/48 |
| 4,681,986 | 7/1987 | Settineri | 174/84 R |
| 4,764,232 | 8/1988 | Hunter | 174/76 |
| 4,767,893 | 8/1988 | Ball et al. | 174/84 R |
| 4,788,089 | 11/1988 | Skipper | 174/DIG. 8 |
| 4,788,254 | 11/1988 | Kawakubo et al. | 525/100 |
| 5,039,735 | 8/1991 | Arai et al. | 524/726 |
| 5,118,755 | 6/1992 | Endo et al. | 524/783 |
| 5,168,124 | 12/1992 | Takase et al. | 174/23 R |
| 5,183,966 | 2/1993 | Hurtado et al. | 174/19 |
| 5,271,081 | 12/1993 | Khalil | 174/23 R |
| 5,312,690 | 5/1994 | Fukuda et al. | 428/447 |

FOREIGN PATENT DOCUMENTS

| | | |
|---|---|---|
| 0330571 | 8/1989 | European Pat. Off. . |
| 850308 | 9/1952 | Germany . |
| 1285036 | 12/1968 | Germany . |
| 2608768 | 9/1977 | Germany . |

Primary Examiner—Morris H. Nimmo
Attorney, Agent, or Firm—Hill, Steadman & Simpson

[57] ABSTRACT

A blockstop which is formed by kneading a curable, water-resistant kneading compound tightly onto the end of the cable and then covering the compound with a shrinkable envelope. Preferably the kneading compound is applied in three layers and the shrinkable envelope is a cold shrinkable tape wound onto the outer layer.

16 Claims, 2 Drawing Sheets

BLOCKSTOP FOR LONGITUDINAL SEALING OF A CABLE AND A METHOD OF FORMING THE BLOCKSTOP

BACKGROUND OF THE INVENTION

The present invention is directed to a method for producing a blockstop or closure for longitudinally sealing a cable, particularly a light waveguide cable.

Blockstops or end closures must be attached to the ends of the cables when there is a risk that water could spread in a longitudinal direction within the cable. For example, such a method for producing a blockstop is disclosed in German Published Application 26 08 768. In this disclosure, blockstops are produced of a casting resin. Since the casting resin, however, is initially presented in liquid form, an appropriate mold must be arranged at the end of the cable and must be filled with the resin. This mold cannot be removed until the casting resin has been completely cured. The production of such a blockstop is, thus, extremely complicated and requires a correspondingly long time as a consequence of the curing time for the casting resin.

SUMMARY OF THE INVENTION

The object of the present invention is to provide an improved method for producing a blockstop and to provide an improved blockstop for the end of a cable, particularly a light waveguide cable.

These objects are obtained with a method wherein the blockstop is composed of a curable, water-resistant kneading compound which is kneaded tightly onto the end of the cables to be sealed and then has a shrinkable envelope applied thereto.

The object is also inventively achieved with a blockstop that is composed of a plurality of layers of curable, water-resistant kneading compound and of a shrinkable envelope layer lying thereover.

Since a mold no longer needs to be available and, since one must no longer wait for the material of which the blockstop is formed to cure, these are great advantages of the method of the invention for producing the blockstop. Thus, a curable, initially plastically deformable material in the form of a kneading compound is employed here, which is applied to the end of a cable, particularly a light waveguide cable, in the way to be set forth in greater detail hereinbelow and it requires no additional apparatus. This kneading compound is preferably composed of two components that are brought together when required and are uniformly mixed with one another. The kneading compound is then applied and an envelope layer of, preferably, a cold-shrinkable material is placed thereover, this effecting that the kneading compound lying therebelow is compressed and is pressed into the cavities that are still open. Since the kneading compound will cure on its own, no additional or further measures are, therefore, required. An example of a desired kneading compound to be used is a compound that is an ISO epoxy resin designated and sold under the tradename M-SEAL by Mahindra Engineering Chemical Products Limited of Bombay, India.

Other advantages and features of the invention will be readily apparent from the following description of the preferred embodiments, the drawings and claims.

DESCRIPTION OF THE PREFERRED EMBODIMENTS

Figure 5:
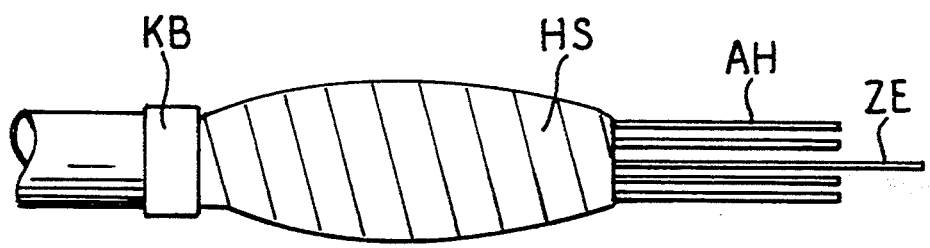
FIG. 5 is a side view showing the blockstop provided with the envelope layer.

The principles of the present invention are particularly useful when forming a blockstop, which is illustrated in FIG. 5, for an end of a cable K.

Figure 1:
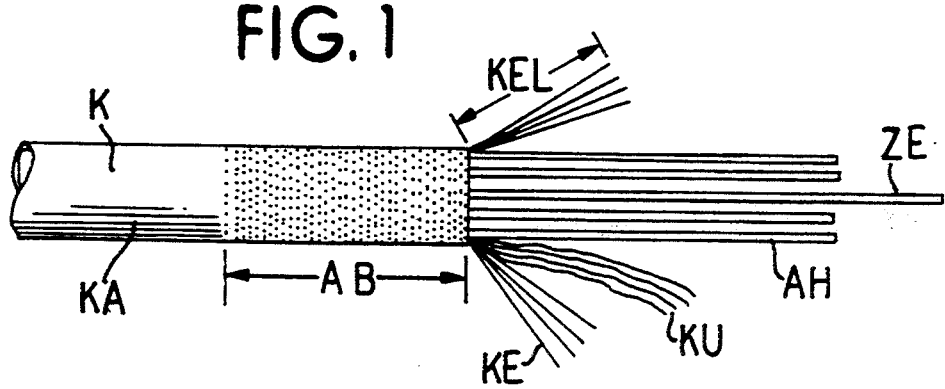
FIG. 1 is a side view of an end of a cable illustrating the first step in the method in accordance with the present invention.

To accomplish this process, the first step for the production of the blockstop of the present invention is to prepare an end of the cable K, as illustrated in FIG. 1, which cable is a light waveguide cable having an outer cladding KA. In the first step, the cladding KA is stripped from the end of a cable so that the lead sheaths or cladded sheaths AH and a center element ZE, as well as tensile threads KE and potential copper leads KU are exposed. The tensile threads KE, which are preferably Kevlar threads, are shortened preferably to a length of approximately 30 mm for the implementation and forming of the blockstop and the end of a cable cladding KA is cleaned and roughened over an annular region AB, preferably having the length of approximately 40 mm. The lead sheaths AH and the Kevlar threads KE and the center element ZE are thereby also cleaned, for example with a solvent such as naphtha. The lead sheaths AH can subsequently be smoothed with a hot-air blower. If shielding connections are still to be potentially produced, then the shielding connection terminals required for this purpose are likewise produced.

Figure 2:
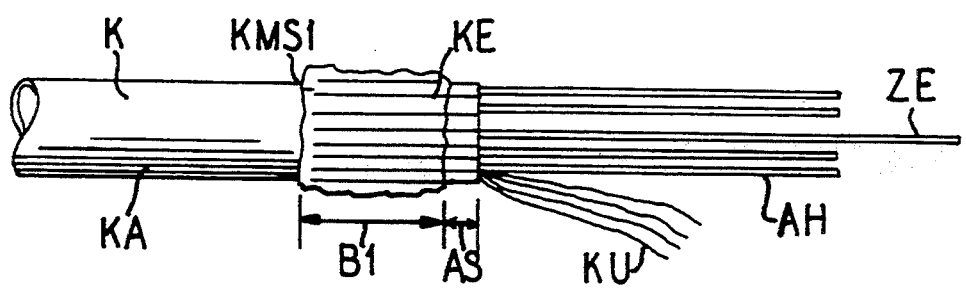
FIG. 2 is a side view of the end of the cable after a first step of applying a first layer of kneading compound and embedding the tensile threads of the light waveguide cable therein.
Figure 3:
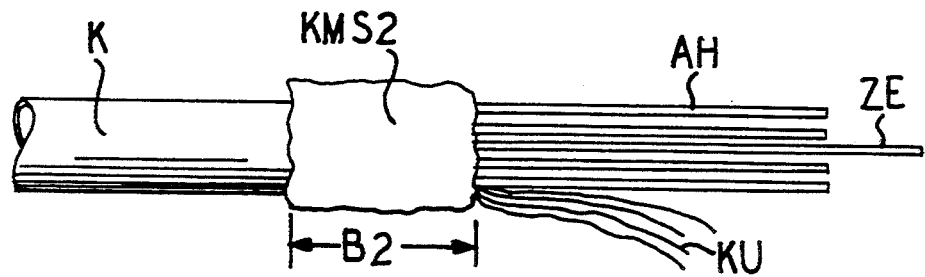
FIG. 3 side view illustrating the addition of a second layer of a kneading compound in accordance with the present invention.

In the next step, as illustrated in FIG. 2, the two components of the kneading compounds are first intimately blended with one another and kneaded until a uniform color of the kneading compound has been achieved. A first layer of kneading compound KMS1 is then applied to the prepared cable cladding KA over a portion B1 of a length of preferably 25 mm so that the end of the cable cladding remains free in a space AS of a length of approximately 5 mm. The tensile threads KE are then bent back into this coated region B1 and embedded therein.

In the next step, a second layer of kneading compound KMS2 is then applied on the first layer KMS1 and onto the bent back tensile threads KE so that the second layer covers the region B2 that is larger than the first and is preferably 30 mm long and extends up to the end of the cable cladding KA of the cable K. The tensile threads KE are completely covered and fixed in this manner.

Figure 4:
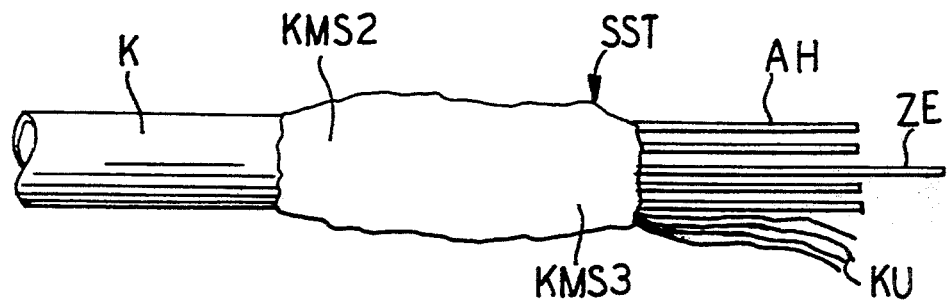
FIG. 4 illustrates the step of applying a third layer of kneading compound on the end face of the cable.

In the next step, a third layer KMS3 (FIG. 4) is now applied, particularly on the end face, and is kneaded and worked in between the lead sheaths AH and the center element ZE and the copper leads KU. Also, if shielding connections are present, this material is kneaded therein so that a tight termination at the end face is formed. The layer KMS3 is thereby mutually kneaded tight with the layer KMS2 and a tight blockstop SST is formed after the curing of a kneaded compound, whereby one need not wait for the kneading compound to cure, since the follow-up work, such as, for example, the removal of a mold, is not necessary.

As illustrated in FIG. 5, the blockstop finally can have an envelope HS composed of a known material. Preferably, however, a cold shrinking tape having a length of approximately 400 mm is employed, and this is spirally wound on and fixed at its end with, for example, an adhesive tape KB.

Although various minor modifications may be suggested by those versed in the art, it should be understood that I wish to embody within the scope of the patent granted hereon all such modifications as reasonably and properly come within the scope of my contribution to the art.

I claim:

1. A method for producing a blockstop for a longitudinal sealing of a cable, said method comprising providing a curable, water-resistant kneading compound, kneading the compound tightly onto an end of the cable to be sealed and then subsequently applying a shrinkable envelope thereon.

2. A method according to claim 1, wherein the step of applying the shrinkable envelope layer includes providing a cold-shrinkable winding tape and winding the tape onto the blockstop.

3. A method according to claim 1, wherein the step of kneading the compound tightly on the end of the cable includes first cleaning an end region of the cable cladding and roughening the region before the application of said kneading compound.

4. A method according to claim 1, wherein the step of applying the kneading compound includes applying the compound in a plurality of annular layers, one upon the other, including applying a first layer initially on the cladding and bending tensile threads of the cable back into the first layer, covering the first layer with a second layer, and then applying a third layer and kneading it between the leads and elements of the cable so that a tight closure is formed with the previously-applied layers.

5. A method according to claim 4, wherein the step of applying the envelope layer provides a cold-shrinkable tape and includes winding the tape onto the blockstop.

6. A method according to claim 4, wherein prior to applying the kneading compound, cleaning and roughening an end region of the cladding before applying the first layer.

7. A method according to claim 4, which includes, prior to applying the kneading compound, removing a portion of the cladding of the cable to expose the inner elements including the tensile threads, roughening a portion of the cladding and cleaning the cladding and exposed elements.

8. A blockstop for a longitudinal sealing on an end of a cable comprising a plurality of layers of a curable, water-resistant kneading compound and said plurality of layers being covered by a shrinkable envelope.

9. A blockstop according to claim 8, wherein the kneading compound is a two-component material.

10. A blockstop according to claim 9, wherein the two component materials is an epoxy resin putty.

11. A blockstop according to claim 8, wherein the shrinkable envelope is composed of a cold shrinkable winding tape arranged over a last layer of the kneading compound.

12. A blockstop according to claim 8, wherein an end region of the cable is roughened and the blockstop extends approximately 40 mm from the end of the cable.

13. A blockstop according to claim 12, wherein the kneading compound comprises a first layer which is applied over approximately 25 mm of a cable and receives ends of tensile threads which are bent back and embedded therein.

14. A blockstop according to claim 13, which includes a second layer of kneading compound extending over the first layer for a distance of approximately 30 mm and a third layer of the kneading compound being applied to an end face of the cable.

15. A blockstop according to claim 14, wherein the shrinkable envelope is formed of a tape wound onto the layers of kneading compound and secured with an adhesive tape.

16. A blockstop according to claim 8, wherein the shrinkable envelope is a cold shrinkable winding tape spirally wound onto the kneading compound and secured with an adhesive tape.

* * * * *